(12) United States Patent
Park et al.

(10) Patent No.: US 11,623,772 B2
(45) Date of Patent: Apr. 11, 2023

(54) ELASTIC METAMATERIAL AND METHOD FOR IMPROVING VIBRATION REDUCTION PERFORMANCE THEREOF

(71) Applicant: INDUSTRY-ACADEMIC COOPERATION FOUNDATION, YONSEI UNIVERSITY, Seoul (KR)

(72) Inventors: No-Cheol Park, Seoul (KR); Joo Young Yoon, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 224 days.

(21) Appl. No.: 17/143,980

(22) Filed: Jan. 7, 2021

(65) Prior Publication Data
US 2021/0206516 A1 Jul. 8, 2021

(30) Foreign Application Priority Data
Jan. 8, 2020 (KR) .......................... 10-2020-0002401

(51) Int. Cl.
*B64G 1/64* (2006.01)
*F16F 7/116* (2006.01)
*B64G 1/22* (2006.01)

(52) U.S. Cl.
CPC .............. *B64G 1/648* (2013.01); *F16F 7/116* (2013.01); *B64G 2001/228* (2013.01); *F16F 2222/08* (2013.01); *F16F 2228/001* (2013.01); *F16F 2228/04* (2013.01); *F16F 2234/00* (2013.01)

(58) Field of Classification Search
CPC .. B64G 1/648; B64G 2001/228; B64G 1/242; B64G 1/32; B64G 1/38
See application file for complete search history.

(56) References Cited

U.S. PATENT DOCUMENTS

| 4,516,746 A * | 5/1985 | Takezawa ................ B64G 1/38 |
| | | 244/170 |
| 2008/0185481 A1* | 8/2008 | Bullock ................. B64G 1/641 |
| | | 244/158.2 |

FOREIGN PATENT DOCUMENTS

| CN | 105333058 A | 2/2016 |
| KR | 20110013402 A | 2/2011 |
| KR | 102007185 B1 | 8/2019 |

* cited by examiner

*Primary Examiner* — Melanie Torres Williams
(74) *Attorney, Agent, or Firm* — McCoy Russell LLP

(57) ABSTRACT

The present invention relates to an elastic metamaterial for reducing vibrations of a flexible structure such as a main cable of a tether system for controlling an orbit of a satellite revolving around a planet, and a method for improving a vibration reduction performance thereof, and more particularly, to an elastic metamaterial having an improved precision, in which a ratio of a cross-sectional area of a pendulum ring may be adjusted to maintain a frequency characteristic other than a band gap generated due to the elastic metamaterial even in a state where a mass of the pendulum ring is not changed, and a band gap (R_ring) generated due to the pendulum ring of the elastic metamaterial and a band gap (R_beam) generated due to the elastic beams may be combined into one band gap to expand a vibration damping range, and a method for improving a vibration reduction performance thereof.

11 Claims, 6 Drawing Sheets

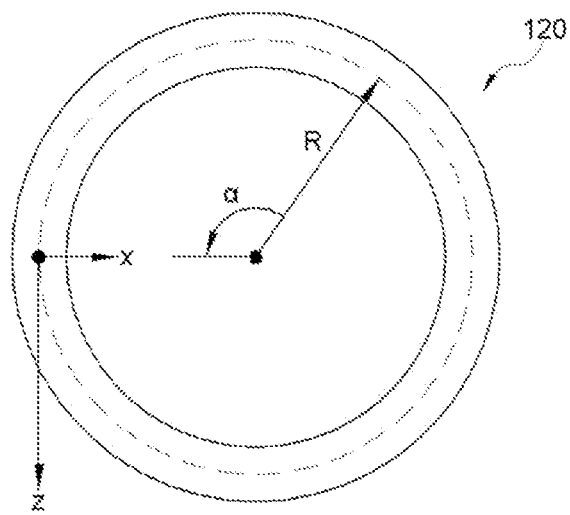
FIG. 4A
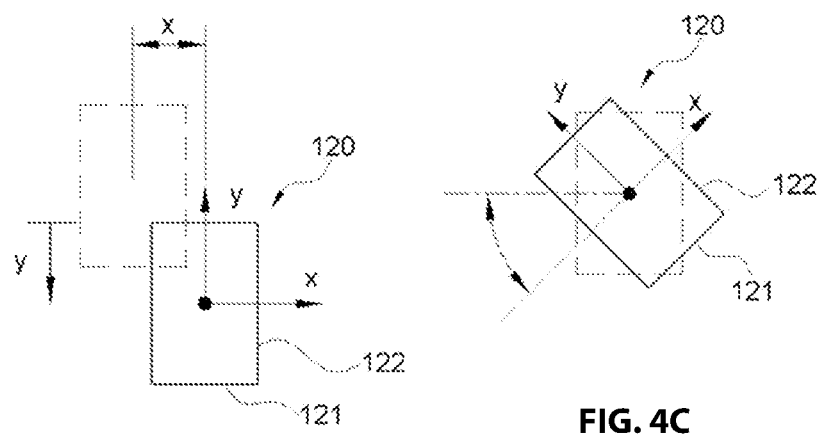
FIG. 4B
FIG. 4C

ELASTIC METAMATERIAL AND METHOD FOR IMPROVING VIBRATION REDUCTION PERFORMANCE THEREOF

CROSS REFERENCE TO RELATED APPLICATION

The present application claims priority to Korean Patent Application No. 10-2020-0002401, entitled "ELASTIC METAMATERIALS AND DAMPING PERFORMANCE IMPROVEMENT METHOD FOR THAT", and filed on Jan. 8, 2020. The entire contents of the above-listed application is hereby incorporated by reference for all purposes.

TECHNICAL FIELD

The following disclosure relates to an elastic metamaterial that is provided in a main cable of a tether system for controlling an orbit of a satellite revolving around a planet and absorbs vibrations or shocks resulting from an external disturbance torque, and a method for improving a vibration reduction performance thereof.

BACKGROUND AND SUMMARY

A satellite is an artificial flight vehicle revolving around a planet, and there are a lot of satellites revolving around the earth. Here, the satellites are divided into a stationary satellite and a mobile satellite depending on an orbit, and may be controlled by using a power source mounted on the satellite itself or an external power source such as solar light at the time of orbiting. While the satellite orbits around a planet, a disturbance torque is generated due to various external factors. Representative examples of such external factors include a gravity gradient and solar radiation pressure, and the disturbance torque is generated due to an atmosphere in a case of a planet with an atmosphere.

Conventionally, a control method for preventing the satellite from escaping from the orbit due to the disturbance torque generated due to the above-described external factors by using a thruster provided in the satellite has been used. However, since a lifespan of the satellite depends greatly on exhaustion of propellant and a lifespan of equipment mounted on the satellite, a technology for reducing the amount of the propellant of the thruster to control the orbit of the satellite has been under development.

Referring to FIG. 1, Korean Patent Publication No. 10-2017-0168315 ("Space Tether Device On Satellite Using Elastic Metamaterial" published on Jul. 30, 2019) of the present applicants discloses a pendulum type elastic metamaterial 100 that is provided in a main cable 20 of a space tether system 1 used for an orbit control of a satellite 10, and absorbs vibrations and shocks resulting from a disturbance torque caused by collision of space debris, a meteorite, or the like generated in a space environment to enable a more precise control of an orbit of the satellite. Here, the elastic metamaterial 100 includes three elastic beams and one pendulum ring. A frequency band gap of a certain range is generated due to resonance of the elastic beams and the pendulum ring, and at this time, the band gap range of the resonance frequency absorbs vibration transferred to the tether device on the satellite.

At this time, the band gap generated by the elastic beams and the pendulum ring may be positioned in a desired frequency band by changing each design variable. However, in a case where a cross section of the pendulum ring has a circular shape, an area moment of inertia with respect to a horizontal axis of a plane of the pendulum ring and an area moment of inertia with respect to a vertical axis of the plane of the pendulum ring are the same, such that an in-plane mode (hereinafter, referred to as an "in mode") in which deformation is made within a two-dimensional plane of the pendulum ring, and an out-of-plane mode (hereinafter, referred to as an "out mode") in which deformation is made outside of the two-dimensional plane of the pendulum ring occur at the same time. Therefore, there is a limitation in that a weight of the pendulum ring is inevitably changed when changing a cross-sectional area of the pendulum ring to change a band gap (R_ring) generated due to resonance of the pendulum ring, and as a result, a frequency characteristic other than the band gap is also changed due to the change of the property of the elastic metamaterial.

RELATED ART DOCUMENT

Patent Document

Korean Patent Publication No. 10-2017-0168315 ("Space Tether Device on Satellite Using Elastic Metamaterial" published on Jul. 30, 2019).

An embodiment of the present invention is directed to providing an elastic metamaterial that may be designed so that a band gap generated due to a pendulum ring is formed in a desired resonance frequency band even in a state where a mass is not changed by adjusting a ratio between a length b of a transverse side and a length h of a longitudinal side of the pendulum ring having a rectangular cross section while maintaining a frequency characteristic other than the band gap by maintaining a weight of the elastic metamaterial, and a method for improving a vibration reduction performance thereof.

In one general aspect, an elastic metamaterial provided on a main cable and absoring due to an external disturbance torque includes: a plurality of elastic beams having one ends connected to the main cable and extending downward in a divergent form; and a pendulum ring connected to the other ends of the elastic beams and having a hollow portion through which the main cable penetrates so as to surround the main cable, wherein a cross section of the pendulum ring has a rectangular shape having a transverse side and a longitudinal side having predetermined lengths.

Here, the pendulum ring has a cross section of which a length b of the transverse side is larger than a length h of the longitudinal side, such that a band gap (R_ring) generated due to the pendulum ring and a band gap (R_beam) generated due to the elastic beams are positioned adjacent to each other, which is advantageous.

In the pendulum ring, a ratio between the length b of the transverse side and the length h of the longitudinal side may be defined so as to maintain a predetermined cross-sectional area according to a predetermined resonance frequency band range.

The length b of the transverse side and the length h of the longitudinal side of the pendulum ring according to the predetermined resonance frequency band range may be defined by at least one of the following Equation 1 or 2:

$$f_i = \frac{i(i^2-1)}{2\pi R^2(i^2+1)^{1/2}}\left[\frac{EI_y}{m}\right]^{1/2} \qquad \text{Equation 1}$$

-continued $$f_i = \frac{i(i^2-1)}{2\pi R^2}\left[\frac{EI_x}{m\left(i^2 + \frac{EI_x}{GC}\right)}\right]^{1/2}$$ Equation 2

(where $I_x$: an area moment of inertia in a transverse direction, $I_y$: an area moment of inertia in a longitudinal direction, $f_i$: a unique frequency, i: a mode order, R: a radius of the pendulum ring, E: a Young's modulus, m: a mass per unit length, b: the length of the transverse side, h: the length of the longitudinal side, G: a shear modulus, and C: a torsional constant).

In another general aspect, a method for improving a vibration reduction performance of the elastic metamaterial having the above-described configuration includes: a frequency moving step of moving a band gap of a resonance frequency of the main cable by adjusting a ratio between a length b of the transverse side and a length h of the longitudinal side of the pendulum ring, the band gap being generated from the pendulum ring.

In the frequency moving step, the ratio between the length b of the transverse side and the length h of the longitudinal side may be adjusted so as to maintain a predetermined cross-sectional area of the pendulum ring.

In the frequency moving step, the length b of the transverse side and the length h of the longitudinal side of the pendulum ring according to a predetermined resonance frequency band range are defined by at least one of the following Equation 1 or 2:

$$f_i = \frac{i(i^2-1)}{2\pi R^2(i^2+1)^{1/2}}\left[\frac{EI_y}{m}\right]^{1/2}$$ Equation 1

$$f_i = \frac{i(i^2-1)}{2\pi R^2}\left[\frac{EI_x}{m\left(i^2 + \frac{EI_x}{GC}\right)}\right]^{1/2}$$ Equation 2

(where $I_x$: an area moment of inertia in a transverse direction, $I_y$: an area moment of inertia in a longitudinal direction, $f_i$: a unique frequency, i: a mode order, R: a radius of the pendulum ring, E: a Young's modulus, m: a mass per unit length, b: the length of the transverse side, h: the length of the longitudinal side, G: a shear modulus, and C: a torsional constant).

In another general aspect, an elastic metamaterial includes: a plurality of elastic beams having one ends connected to a main cable and extending downward in a divergent form; a pendulum ring connected to the other ends of the elastic beams and having a hollow portion through which the main cable penetrates so as to surround the main cable; and a vibration control member having a predetermined damping ratio, and applied to an outer surface of at least one of the main cable, the elastic beams, or the pendulum ring.

The vibration control member may be formed of a water-based vibration control paint having a predetermined damping ratio, and may be applied to the outer surface of at least one of the main cable, the elastic beams, or the pendulum ring.

The method may further include a frequency combining step of combining band gaps of the resonance frequency of the main cable by providing a vibration control paint having a predetermined damping ratio on an outer surface of at least one of the main cable, the elastic beams, or the pendulum ring, the band gaps being generated due to resonance of the elastic metamaterial.

In the frequency combining step, a water-based vibration control paint having a predetermined damping ratio may be applied to the outer surface of at least one of the main cable, the elastic beams, or the pendulum ring.

In another general aspect, an elastic metamaterial includes: a plurality of elastic beams having one ends connected to a main cable and extending downward in a divergent form; a pendulum ring connected to the other ends of the elastic beams and having a hollow portion through which the main cable penetrates so as to surround the main cable; and a vibration control member having a predetermined unique frequency, and applied to an outer surface of at least one of the main cable, the elastic beams, or the pendulum ring, wherein a cross section of the pendulum ring has a rectangular shape having a transverse side and a longitudinal side having predetermined lengths.

In another general aspect, a method for improving a vibration reduction performance of the elastic metamaterial having the above-described configuration includes: a frequency moving step of moving a band gap of a resonance frequency of the main cable by adjusting a ratio between a length b of the transverse side and a length h of the longitudinal side of the pendulum ring, the band gap being generated from the pendulum ring; and a frequency combining step of combining band gaps of the resonance frequency of the main cable by providing a vibration control paint having a predetermined damping ratio on an outer surface of at least one of the main cable, the elastic beams, or the pendulum ring, the band gaps being generated due to resonance of the elastic metamaterial.

Other features and aspects will be apparent from the following detailed description, the drawings, and the claims.

BRIEF DESCRIPTION OF THE FIGURES

FIGS. 4A to 4C are diagrams for describing deformation caused by resonance of a pendulum ring according to an exemplary embodiment of the present invention.

DETAILED DESCRIPTION OF MAIN ELEMENTS

Figure 1:
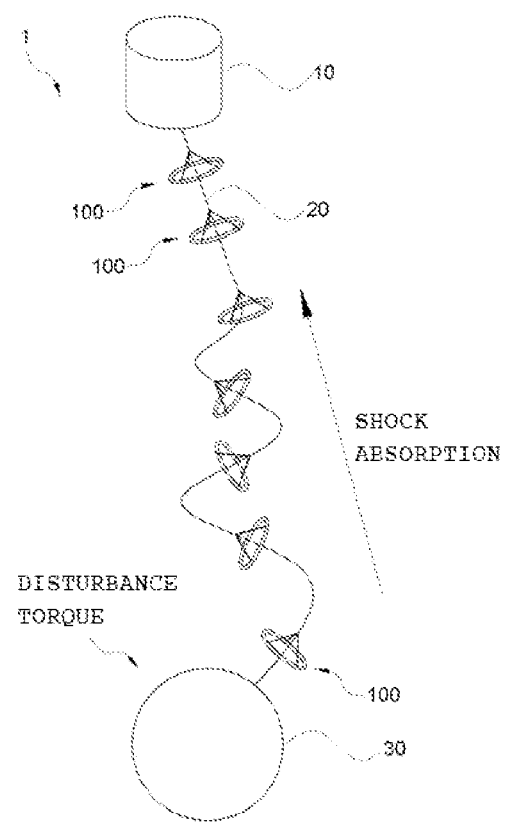
FIG. 1 is a diagram illustrating a space tether system on a satellite according to an exemplary embodiment of the present invention.

1: Tether system
10: Satellite
20: Main cable
30: Plasma contactor
100: Elastic Metamaterial
110: Elastic beam
120: Pendulum ring
121: Transverse side 122: Longitudinal side
b: Length of transverse side
h: Length of longitudinal side

DETAILED DESCRIPTION

Since the present invention may be variously modified and have several exemplary embodiments, specific exemplary embodiments will be shown in the accompanying drawings and be described in detail. However, it is to be understood that the present invention is not limited to the specific exemplary embodiments, but includes all modifications, equivalents, and substitutions included in the spirit and the scope of the present invention.

It is to be understood that when one element is referred to as being "connected to" or "coupled to" another element, it may be connected directly to or coupled directly to another element or be connected to or coupled to another element, having the other element intervening therebetween.

Unless indicated otherwise, it is to be understood that all the terms used in the specification including technical and scientific terms have the same meaning as those that are understood by those who skilled in the art.

It must be understood that the terms defined by the dictionary are identical with the meanings within the context of the related art, and they should not be ideally or excessively formally defined unless the context clearly dictates otherwise.

Hereinafter, a technical spirit of the present invention will be described in more detail with reference to the accompanying drawings.

The accompanying drawings are only examples illustrated in order to describe the technical idea of the present invention in more detail. Therefore, the technical idea of the present invention is not limited to forms of the accompanying drawings.

Referring to FIG. 1, a space tether device 1 using an elastic metamaterial according to the present invention may include a satellite 10 revolving around a planet, a main cable 20, a plasma contactor 30, and an elastic metamaterial 100.

The space tether device 1 includes the main cable 20 connected to the satellite 10, and the plasma contactor 30 connected to a lower side of the main cable 20. A current generated by electron emission and electrification in the plasma contactor flows through the main cable 20, and a Lorentz force is generated by an interaction between an earth's magnetic field and the space tether device. Here, the Lorentz force refers to a force received by a charge moving within an electromagnetic field. Thrust in a movement direction of the satellite or drag in a direction opposite to the movement direction of the satellite 10 is applied by the current generated by electron emission or electrification in the plasma contactor 30 and flowing in the main cable 20, and the earth's magnetic field.

Here, the space tether device is a technology of performing a control to prevent the satellite 10 from escaping from an orbit by adjusting the intensity of the thrust or drag applied to the satellite through adjustment of the intensity of the current flowing in the main cable 20.

However, in the space tether device according to the related art, when an excessive thrust and drag are applied to the main cable 20, the main cable 20 is tangled, or the Lorentz force applied to the main cable 20 is dispersively applied in multiple directions due to an external disturbance torque, which results in instability affecting the movement of the main cable 20 and the plasma contactor 30.

The elastic metamaterial 100 is provided in the main cable 20 and absorbs vibrations and shocks resulting from the external disturbance torque to prevent the vibrations and shocks from being transferred to the satellite 10, such that it is possible to secure robustness of the space tether device against the disturbance torque and to prevent an instable movement of the main cable. The disturbance torque refers to an external force applied from the outside, and means vibrations, shocks, and the like that result from an external interference disturbing the orbiting of the satellite 10 and are irregularly applied at the time of the orbiting of the satellite 10.

In the present invention, the satellite 10 is described as a flight vehicle revolving around a planet. However, the elastic metamaterial 100 according to the present invention may be applied to various tether devices that are applied to a flight vehicle that flies in a regular orbit in the earth, such as an aircraft or an unmanned air vehicle, without departing from the gist of the present invention.

The main cable 20 is a cable connected to a lower side of the satellite 10 and extending downward. In the main cable 20, a conducting wire in which a current may flow is formed, and a coating material encloses an outer portion of the conducting wire. In a case of a main cable that does not include the elastic metamaterial 100, the vibrations or shocks resulting from the external disturbance torque are transferred to the satellite, which may cause an error in the orbiting of the satellite receiving the disturbance torque. Therefore, according to the present invention, the elastic metamaterial 100 prevents the disturbance torque from being transferred to the satellite 10, thereby enabling an exact orbiting of the satellite 10.

The plasma contactor 30 is connected to the lower side of the main cable 20. As negative electrons are electrified or emitted in the plasma contactor 30, a current flows in the main cable 20, and the Lorentz force is generated by an interaction with a magnetic field of a planet around which the satellite 10 revolves. Here, the plasma contactor 30 is a component for electrifying or emitting negative electrons floating in space so that a current may flow in the main cable 20, and may control the emission or electrification of the negative electrons to generate the thrust or drag for controlling the orbiting of the satellite 10.

Here, the elastic metamaterial 100 may be variously modified for reducing vibrations of a flexible structure used in a general industrial field in addition to the pendulum type space tether device 1 described above, without departing from the gist of the present invention.

Elastic Metamaterial

Figure 2:
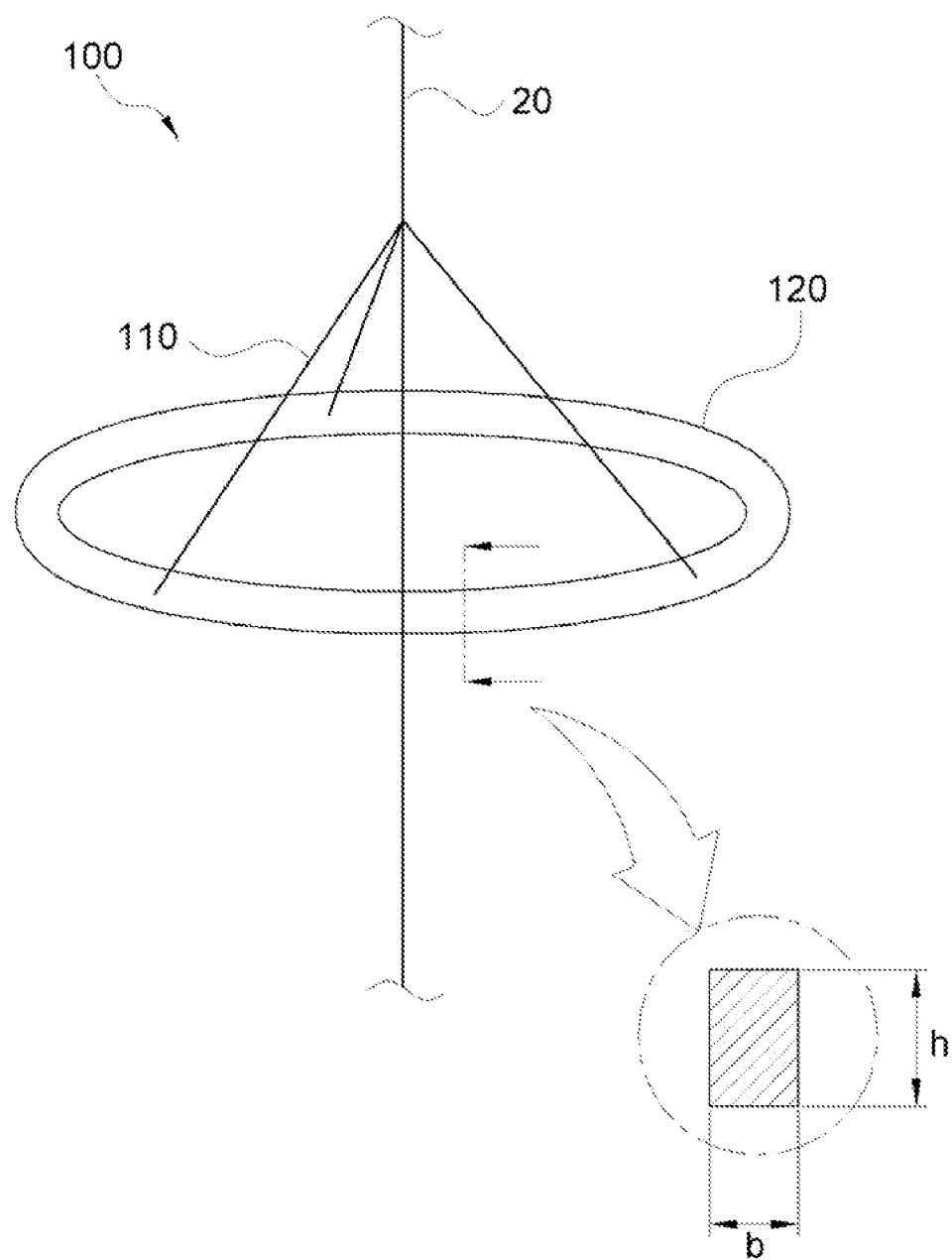
FIG. 2 is a perspective view illustrating an elastic metamaterial according to an exemplary embodiment of the present invention.
Figure 3A:
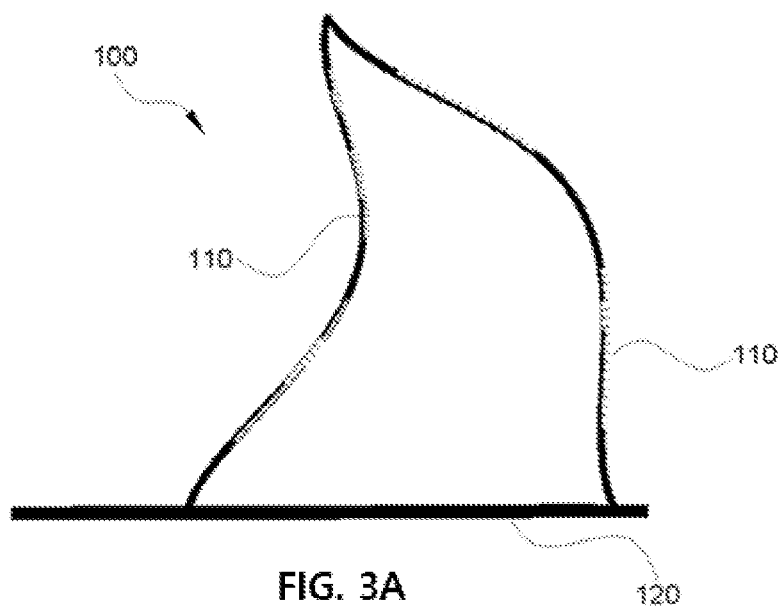
FIGS. 3A and 3B are side views each illustrating the elastic metamaterial deformed at a specific frequency.
Figure 3B:
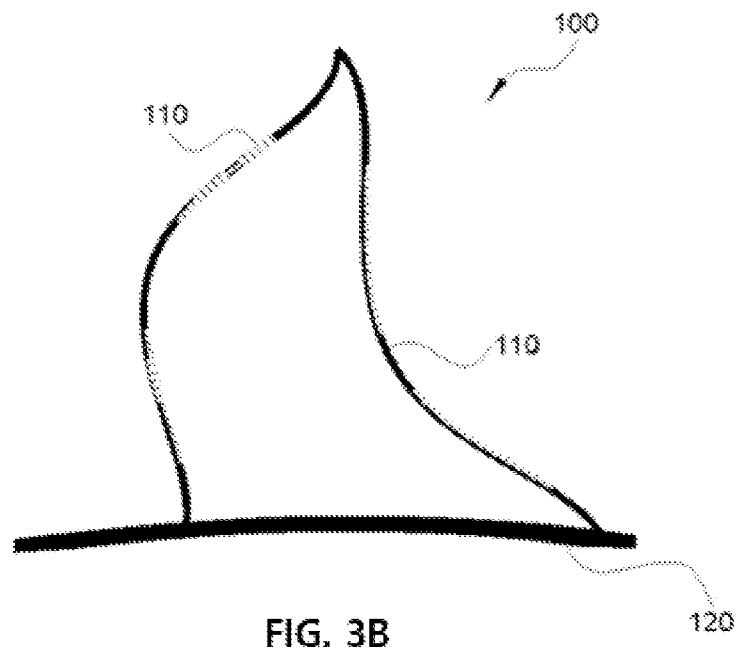

FIG. 2 is a perspective view illustrating the elastic metamaterial according to an exemplary embodiment of the present invention, FIGS. 3A and 3B are side views each illustrating the elastic metamaterial deformed at a specific frequency, and FIGS. 4A to 4C are diagrams for describing deformation caused by resonance of a pendulum ring according to an exemplary embodiment of the present invention. Referring to FIGS. 2 to 4C, the elastic metamaterial 100 according to an exemplary embodiment of the present invention may include three elastic beams 110 connected to the main cable 20 and extending downward in a divergent form, and a pendulum ring 120 connected to ends of the elastic beams 110 and having a circular ring shape with a hollow portion through which the main cable 20 penetrates so as to surround the main cable 20.

In general, the metamaterial is an assembly of composite elements formed of general materials such as metals, and the metamaterials are arranged in repeating patterns and have a property depending on a structure of the patterns in which the metamaterials are arranged, rather than having a characteristic of a base material. According to the present invention, since the elastic metamaterial 100 has a structure including three elastic beams 110 and the pendulum ring 120, when shock waves or vibrations resulting from the disturbance torque are transferred, resonance occurs in a transverse direction of the main cable 20, and thus, the elastic metamaterial 100 has a negative effective density and effective rigidity in a specific frequency range.

More specifically, in the elastic metamaterial 100, three elastic beams 110 that have one sides connected to the main cable 20, and the other sides connected to the pendulum ring 120 transfer, to the pendulum ring 120, the vibrations or shock waves resulting from the disturbance torque applied from the main cable 20. Different tensions are generated in three elastic beams 110 due to movement caused by the resonance and pendular movement of the pendulum ring 120, and therefore, three elastic beams 110 function as springs between the pendulum ring 120 and the main cable 20. Referring to FIGS. 4A to 4C, when one side of the pendulum ring 120 moves upward due to the disturbance torque applied to the main cable 20, as the tension of one elastic beam 110 connected to one side of the pendulum ring 120 decreases, the disturbance torque applied to the main cable 20 is offset by the tension of another elastic beam 110 connected in a direction opposite to the disturbance torque applied to the main cable 20. Further, the elastic metamaterial 100 absorbs vibrations and shock waves resulting from the disturbance torque applied to the main cable 20 by repeating the above-described action.

Further, it is preferable that the other ends of the elastic beams 110 of the elastic metamaterial 100 that are connected to the pendulum ring 120 are radially connected at the same intervals. Here, a plurality of elastic beams 110 may be connected. However, it is most preferable that three elastic beams 110 are radially connected to the pendulum ring 120 so that the elastic beams 110 may be under the same tension according to the movement of the pendulum ring 120. Further, the elastic beams 110 may be variously modified without departing from the gist of the present invention, because the angle and number of the elastic beams 110 may be changed according to mass distribution of the pendulum ring 120.

In a case of the elastic metamaterial according to the related art, since a cross section of a pendulum ring has a circular shape, an area moment of inertia with respect to a horizontal axis of a plane of the pendulum ring and an area moment of inertia with respect to a vertical axis of the plane of the pendulum ring are the same, such that an in-plane mode (hereinafter, referred to as an "in mode") in which deformation is made within a two-dimensional plane of the pendulum ring, and an out-of-plane mode (hereinafter, referred to as an "out mode") in which deformation is made outside of the two-dimensional plane of the pendulum ring occur at the same time. Therefore, there is a limitation in that a resonance frequency band range is different between a band gap (R_beam) generated due to resonance of the elastic beams and a band gap (R_ring) generated due to resonance of the pendulum ring, and as a result, expansion of the band gap is limited.

On the other hand, in the elastic metamaterial 100 according to the present invention, a cross section of the pendulum ring 120 has a rectangular shape having a transverse side 121 and a longitudinal side 122 having predetermined lengths. Therefore, as illustrated in FIGS. 3A and 3B, deformation of the elastic metamaterial 100 according to a band gap (R_beam) generated due to resonance of the elastic beams and deformation of the elastic metamaterial 100 according to a band gap (R_ring) generated due to resonance of the pendulum ring occur independently of each other, and thus, the elastic metamaterial 100 may be designed so that a range of the band gap (R_ring) (hereinafter, referred to as a ring band gap) generated due to the resonance of the pendulum ring 120 is adjacent to the band gap (R_beam) (hereinafter, referred to as a beam band gap) generated due to the resonance of the elastic beams 110 to prevent the beam band gap from being affected, by moving the range of the ring band gap (R_ring) generated due to the resonance of the pendulum ring 120, while maintaining a frequency characteristic other than the band gap by changing the shape of the cross section of the pendulum ring 120 without changing the weight of the pendulum ring 120. Here, FIGS. 3A and 3B are side views illustrating shapes of the elastic metamaterial 100 deformed due to the resonance at a specific frequency, the elastic metamaterial 100 including the pendulum ring 120 whose cross section has a rectangular shape. FIG. 3A illustrates a shape of the elastic metamaterial 100 deformed due to the resonance of the elastic beams 110 at 1560 Hz, and FIG. 3B illustrates a shape of the elastic metamaterial 100 deformed due to the resonance of the pendulum ring 120 at 1689 Hz. Here, as illustrated in FIG. 3A, it may be appreciated that the deformation of the elastic metamaterial 100 in which the cross section of the pendulum ring 120 has a rectangular shape occurs independently of the pendulum ring 120, the deformation being caused by the resonance of the elastic beams 110.

That is, the elastic metamaterial 100 may be designed so as to decrease a distance between the beam band gap range and the ring band gap range by changing the shape of the cross section of the pendulum ring 120, such that it is possible to further improve precision of a specific resonance frequency band range.

It is preferable that a ratio between a length b of a transverse side and a length h of a longitudinal side of the pendulum ring 120 is defined so as to maintain a predetermined cross-sectional area according to a predetermined resonance frequency band range. Here, the length b of the transverse side and the length h of the longitudinal side of the pendulum ring 120 according to the predetermined resonance frequency band range are derived from an in mode shape and an out mode shape into which the pendulum ring 120 is deformed, the pendulum ring 120 resonating in the predetermined resonance frequency band range.

More specifically, as illustrated in FIG. 4A to 4C, the other ends of the plurality of elastic beams 110 are fixed to the pendulum ring 120 on the same plane while forming a predetermined radial angle α, and a unique frequency of the pendulum ring 120 with a radius R is derived from an area moment of inertia $$I_x = \frac{bh^3}{12}$$

in an x-axis direction and an area moment of inertia $$I_y = \frac{b^3 h}{12}$$

in a y-axis direction of a unit cross section of the pendulum ring 120 on an xy plane in a direction facing the cross section of the pendulum ring 120 as illustrated in FIG. 4B.

Here, the area moment of inertia ($I_y$) in the y-axis direction is derived from a length of the cross section of the pendulum ring 120 deformed in the y-axis direction as illustrated in FIG. 4B, and the area moment of inertia ($I_x$) in the x-axis direction is derived from distortion in the x-axis direction and the y-axis direction and a length of the cross section of the pendulum ring 120 deformed in the x-axis direction as illustrated in FIG. 4C.

That is, a unique frequency f of the pendulum ring 120 according to the area moment of inertia ($I_y$) in the y-axis direction may be defined by the following Equation 1.

$$f_i = \frac{i(i^2-1)}{2\pi R^2(i^2+1)^{1/2}}\left[\frac{EI_y}{m}\right]^{1/2} \quad \text{Equation 1}$$

(Here, $I_y$: area moment of inertia in longitudinal direction, $f_i$: unique frequency, i: mode order, R: radius of pendulum ring, E: Young's modulus, and m: mass per unit length.)

The area moment of inertia ($I_y$) in the longitudinal direction is determined depending on the shape of the cross section of the pendulum ring 120, and the area moment of inertia ($I_y$) in the longitudinal direction of the pendulum ring 120 whose cross section has a rectangular shape according to the present invention is defined by the following Equation 1-1.

$$I_y = \frac{b^3 h}{12} \quad \text{Equation 1-1}$$

(Here, b: the length of the transverse side, and h: the length of the longitudinal side.)

Further, a unique frequency f of the pendulum ring 120 according to the area moment of inertia ($I_x$) in the x-axis direction may be defined by the following Equation 2.

$$f_i = \frac{i(i^2-1)}{2\pi R^2}\left[\frac{EI_x}{m\left(i^2+\frac{EI_x}{GC}\right)}\right]^{1/2} \quad \text{Equation 2}$$

(Here, $I_x$: the area moment of inertia in the transverse direction, $f_i$: the unique frequency, i: a mode order, R: a radius of the pendulum ring, E: a Young's modulus, m: a mass per unit length, b: the length of the transverse side, h: the length of the longitudinal side, G: a shear modulus, and C: a torsional constant.)

The area moment of inertia ($I_x$) in the transverse direction is determined depending on the shape of the cross section of the pendulum ring 120, and the area moment of inertia ($I_x$) in the transverse direction of the pendulum ring 120 whose cross section has a rectangular shape is defined by the following Equation 2-1.

$$I_x = \frac{bh^3}{12} \quad \text{Equation 2-1}$$

(Here, b: the length of the transverse side, and h: the length of the longitudinal side.)

Accordingly, it is preferable that the length b of the transverse side and the length h of the longitudinal side of the pendulum ring according to the predetermined resonance frequency band range are defined by at least one of Equation 1 or 2 above, and it is more preferable that the length b of the transverse side and the length h of the longitudinal side of the pendulum ring according to a predetermined resonance frequency band range to be specified may be defined by Equations 1 and 2 above.

First Experimental Example: Moving Band Gap

Figure 5:
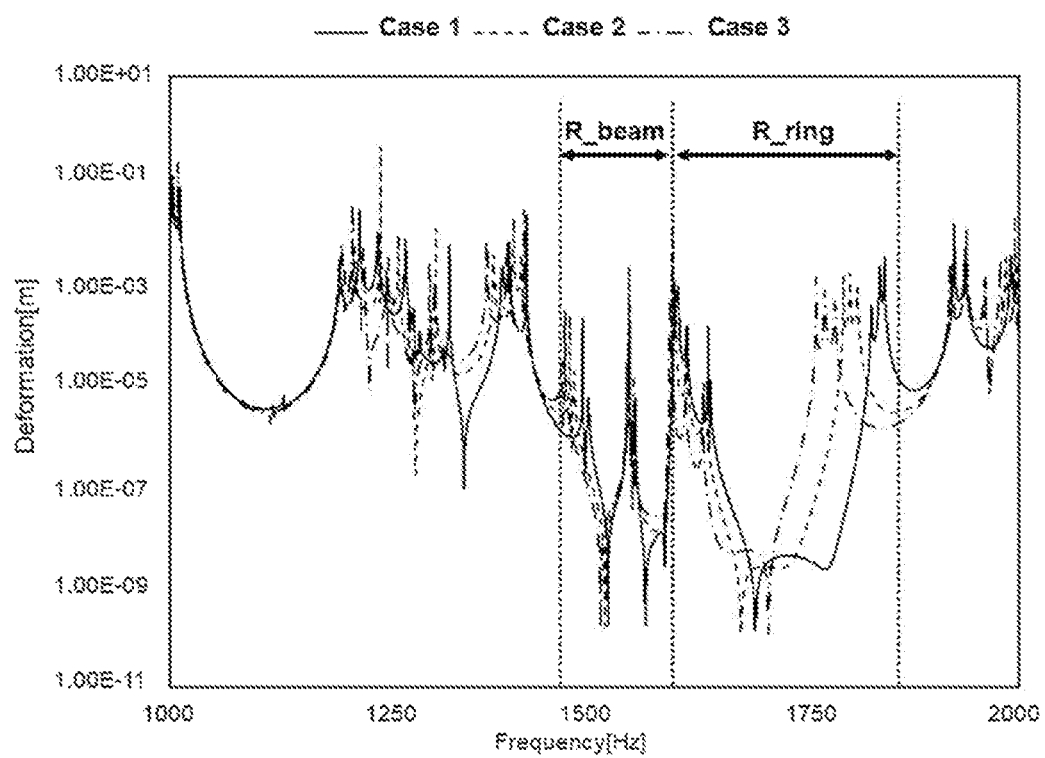
FIG. 5 is a harmonic response analysis graph of an elastic metamaterial according to a first experimental example of the present invention.

FIG. 5 is a graph obtained by analyzing a harmonic response of the main cable 20 to the resonance of the elastic metamaterial according to a first experimental example of the present invention. Referring to FIG. 5, deformation with respect to a frequency generated in the main cable 20 was measured while changing a ratio (h/b) between the length b of the transverse side 121 and the length h of the longitudinal side 122 of the pendulum ring 120. In Case 1, the ratio (h/b) between the length b of the transverse side 121 and the length h of the longitudinal side 122 of the pendulum ring 120 was set to 1/5, in Case 2, the ratio (h/b) between the length b of the transverse side 121 and the length h of the longitudinal side 122 of the pendulum ring 120 was set to 1/5.5, and in Case 3, the ratio (h/b) between the length b of the transverse side 121 and the length h of the longitudinal side 122 of the pendulum ring 120 was set to 1/6.

That is, the tendency of the harmonic response of the main cable 20 according to a gradual increase of the length b of the transverse side in order of Case 1, Case 2, and Case 3 with the same cross-sectional area of the pendulum ring 120 could be appreciated. That is, referring to FIG. 5, it can be appreciated that a change of the range of the band gap (R_beam) generated due to the resonance of the elastic beams 110 is small even when the ratio (h/b) between the length b of the transverse side and the length h of the longitudinal side of the pendulum ring 120 is changed, whereas, the band gap (R_ring) generated due to the resonance of the pendulum ring 120 tends to significantly move to a low frequency range when the ratio (h/b) between the length b of the transverse side and the length h of the longitudinal side of the pendulum ring 120 decreases (the length b of the transverse side increases). That is, it is preferable that the pendulum ring 120 has a cross section of which the length b of the transverse side is larger than the length h of the longitudinal side. Accordingly, the elastic metamaterial 100 is designed so that the ring band gap (R_ring) is adjacent to the beam band gap (R_beam) to design one wide resonance frequency band range, thereby making it possible to have a higher precision.

Second Experimental Example: Vibration Control Member

Figure 6:
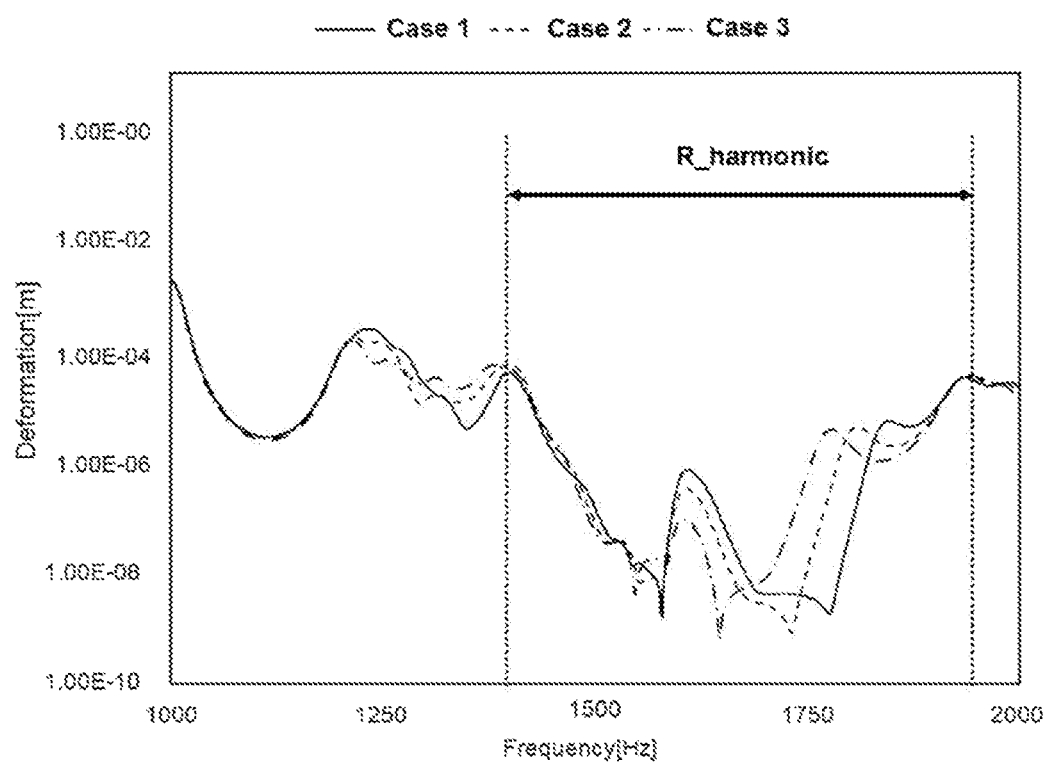
FIG. 6 is a harmonic response analysis graph of an elastic metamaterial according to a second experimental example of the present invention.

FIG. 6 is a graph obtained by analyzing a harmonic response of the main cable to the resonance of the elastic metamaterial 100 including a vibration control member (not illustrated) provided on a surface of the elastic metamaterial and having a predetermined damping ratio, according to three cases in the above-described first experimental example. Referring to FIG. 6, the elastic metamaterial 100 generally formed of metal has no resisting element for damping vibrations, and thus, a sharp deformation peak of the harmonic response analysis graph is measured (see FIG. 5). Therefore, the elastic metamaterial 100 according to the present invention further includes the vibration control member (not illustrated) having a predetermined damping ratio and provided on an outer surface of at least one of the main cable 20, the elastic beam 110, or the pendulum ring 120, and the vibration control member serves as a resisting factor against the deformation of the elastic metamaterial 100 due to the resonance, such that the deformation peak of the harmonic response analysis graph is rounded off as illustrated in FIG. 6. As a result, one band gap (R_harmonic) in which the ring band gap (R_ring) and the beam band gap (R_beam) are combined is generated.

Here, it is preferable that the vibration control member is formed of a water-based vibration control paint having a predetermined damping ratio, and more preferably, the highest precision may be obtained by applying a water-based vibration control paint having the same damping ratio on outer surfaces of all of the main cable 20, the elastic beams 110, and the pendulum ring 120. Here, the water-based vibration control paint is a water-based paint in which various functional filling materials and additives are added to an acryl-based emulsion having an excellent vibration control performance and weather resistance. The water-based vibration control paint may be applied to the outer surfaces of the main cable 20, the elastic beams 110, and the pendulum ring 120 by using a spray, a brush, a roller, or the like, and in this case, the type, the composition ratio, and an application method of the water-based vibration control paint may vary without departing from the gist of the present invention.

Method for Improving Vibration Reduction Performance of Elastic Metamaterial

Hereinafter, a method for improving a vibration reduction performance of the elastic metamaterial 100 according to the present invention having the above-described configuration will be described.

As described above, the method for improving a vibration reduction performance of the elastic metamaterial 100 may include: a frequency moving step (S100) of moving a band gap (R_ring) generated due to the resonance of the pendulum ring 120 to a low frequency range by adjusting a ratio between the length b of the transverse side 121 and the length h of the longitudinal side 122 of the pendulum ring 120 to position the band gap (R_ring) so as to be adjacent the band gap (R_beam) generated due to the resonance of the elastic beams 110; and a frequency combining step (S200) of combining the band gap (R_beam) generated by the resonance of the elastic beams 110 and the band gap (R_ring) generated due to the resonance of the pendulum ring 120 by providing a vibration control paint having a predetermined damping ratio on an outer surface of at least one of the main cable 20, the elastic beams 110, or the pendulum ring 120.

Here, it is preferable that the length b of the transverse side and the length h of the longitudinal side is adjusted to maintain a predetermined cross-sectional area of the pendulum ring in the frequency moving step (S100), it is preferable that the length b of the transverse side and the length h of the longitudinal side of the pendulum ring according to the predetermined resonance frequency band range are defined by at least one of Equation 1 or 2 above in the frequency moving step (S100), and it is more preferable that the length b of the transverse side and the length h of the longitudinal side of the pendulum ring according to a predetermined resonance frequency band range to be specified may be defined by Equations 1 and 2 above.

Further, it is preferable that a water-based vibration control paint having a predetermined damping ratio is applied to the outer surface of at least one of the main cable 20, the elastic beams 110, or the pendulum ring 120 in the frequency combining step (S200), and more preferably, the highest precision may be obtained by applying a water-based vibration control paint having the same damping ratio on the outer surfaces of all of the main cable 20, the elastic beams 110, and the pendulum ring 120.

As described above, according to the present invention, the band gap generated due to the pendulum ring may be moved to a desired frequency band even in a state where the mass of the pendulum ring is not changed, by adjusting a ratio of the cross-sectional area of the pendulum ring, a vibration damping range may be expanded by positioning the band gap so as to be adjacent to a frequency band of the band gap generated due to the elastic beams and formed independently, and the band gap (R_ring) generated due to the pendulum ring of the elastic metamaterial and the band gap (R_beam) generated due to the elastic beams may be combined into one band gap.

Further, a water-based vibration control paint may be applied to the outer surface of the elastic metamaterial formed of metal to round off a shaft deformation peak, thereby combining the band gap (R_beam) generated due to the elastic beams and the band gap (R_ring) generated due to the pendulum ring into one band gap (R_harmonic).

The present invention is not limited to the above-mentioned exemplary embodiments, and may be variously applied, and may be variously modified without departing from the gist of the present invention claimed in the claims.

The invention claimed is:

1. An elastic metamaterial provided on a main cable and absorbing due to an external disturbance torque, the elastic metamaterial comprising:
   a plurality of elastic beams having one ends connected to the main cable and extending downward in a divergent form; and
   a pendulum ring connected to the other ends of the elastic beams and having a hollow portion through which the main cable penetrates so as to surround the main cable, wherein a cross section of the pendulum ring has a rectangular shape having a transverse side and a longitudinal side having predetermined lengths.

2. The elastic metamaterial of claim 1, wherein in the pendulum ring, a ratio between a length of the transverse side and a length of the longitudinal side is defined so as to maintain a predetermined cross-sectional area according to a predetermined resonance frequency band range.

3. The elastic metamaterial of claim 2, wherein the length of the transverse side and the length of the longitudinal side of the pendulum ring according to the predetermined resonance frequency band range are defined by at least one of the following Equation 1 or 2:

$$f_i = \frac{i(i^2-1)}{2\pi R^2(i^2+1)^{1/2}}\left[\frac{EI_y}{m}\right]^{1/2} \quad \text{Equation 1}$$

$$f_i = \frac{i(i^2-1)}{2\pi R^2}\left[\frac{EI_x}{m\left(i^2+\frac{EI_x}{GC}\right)}\right]^{1/2} \quad \text{Equation 2}$$

(where $I_x$: an area moment of inertia in a transverse direction, $I_y$: an area moment of inertia in a longitudinal direction, $f_i$: a unique frequency, i: a mode order, R: a radius of the pendulum ring, E: a Young's modulus, m: a mass per unit length, G: a shear modulus, and C: a torsional constant).

4. The elastic metamaterial of claim 2, wherein the pendulum ring has a cross section of which the length of the transverse side is larger than the length of the longitudinal side.

5. The elastic metamaterial of claim 1, further comprising a vibration control member provided on an outer surface of at least one of the main cable, the elastic beams, or the pendulum ring.

6. The elastic metamaterial of claim 5, wherein the vibration control member is formed of a water-based vibration control paint having a predetermined damping ratio, and is applied to the outer surface of at least one of the main cable, the elastic beams, or the pendulum ring.

7. A method for improving a vibration reduction performance of the elastic metamaterial of claim 1, the method comprising:
    a frequency moving step of moving a band gap of a resonance frequency of the main cable by adjusting a ratio between a length b of the transverse side and a length h of the longitudinal side of the pendulum ring, the band gap being generated from the pendulum ring.

8. The method of claim 7, wherein in the frequency moving step, the ratio between the length of the transverse side and the length of the longitudinal side is adjusted so as to maintain a predetermined cross-sectional area of the pendulum ring.

9. The method of claim 8, wherein in the frequency moving step, the length of the transverse side and the length of the longitudinal side of the pendulum ring according to a predetermined resonance frequency band range are defined by at least one of the following Equation 1 or 2:

$$f_i = \frac{i(i^2-1)}{2\pi R^2 (i^2+1)^{1/2}} \left[\frac{EI_y}{m}\right]^{1/2} \quad \text{Equation 1}$$

$$f_i = \frac{i(i^2-1)}{2\pi R^2} \left[\frac{EI_x}{m\left(i^2 + \frac{EI_x}{GC}\right)}\right]^{1/2} \quad \text{Equation 2}$$

(where $I_x$: an area moment of inertia in a transverse direction, $I_y$: an area moment of inertia in a longitudinal direction, $f_i$: a unique frequency, i: a mode order, R: a radius of the pendulum ring, E: a Young's modulus, m: a mass per unit length, G: a shear modulus, and C: a torsional constant).

10. The method of claim 7, further comprising a frequency combining step of combining band gaps of the resonance frequency of the main cable by providing a vibration control paint having a predetermined damping ratio on an outer surface of at least one of the main cable, the elastic beams, or the pendulum ring, the band gaps being generated due to resonance of the elastic metamaterial.

11. The method of claim 10, wherein in the frequency combining step, a water-based vibration control paint having a predetermined damping ratio is applied to the outer surface of at least one of the main cable, the elastic beams, or the pendulum ring.

* * * * *